United States Patent
Ham et al.

(10) Patent No.: US 9,637,644 B2
(45) Date of Patent: May 2, 2017

(54) COMPOSITION FOR COATING FILM TO PREVENT CONSPICUOUS FINGERPRINTS, COATING FILM TO PREVENT CONSPICUOUS FINGERPRINTS USING THE COMPOSITION, AND ARTICLE HAVING THE COATING FILM

(75) Inventors: Cheol Ham, Yongin-si (KR); In-oh Hwang, Seongnam-si (KR); Byung-ha Park, Suwon-si (KR); Soo-jin Park, Hwaseong-si (KR); Seung-hoon Kal, Anyang-si (KR); Myung-gon Kim, Hwaseong-si (KR); Saim Saher, Seoul (KR); Jin-wook Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1385 days.

(21) Appl. No.: 13/343,953

(22) Filed: Jan. 5, 2012

(65) Prior Publication Data
US 2012/0174823 A1 Jul. 12, 2012

(30) Foreign Application Priority Data
Jan. 10, 2011 (KR) .......................... 10-2011-0002338

(51) Int. Cl.
| C09D 183/04 | (2006.01) |
|---|---|
| C09D 5/16 | (2006.01) |
| G02B 1/10 | (2015.01) |
| G02B 27/00 | (2006.01) |
| C08G 77/18 | (2006.01) |
| C08K 5/5419 | (2006.01) |

(52) U.S. Cl.
CPC ......... *C09D 5/1675* (2013.01); *C09D 183/04* (2013.01); *G02B 1/10* (2013.01); *G02B 27/0006* (2013.01); *C08G 77/18* (2013.01); *C08K 5/5419* (2013.01)

(58) Field of Classification Search
CPC ....... C09D 5/1675; C09D 183/04; G02B 1/10
USPC ....................... 106/287.14; 427/255.6, 430.1
See application file for complete search history.

(56) References Cited

U.S. PATENT DOCUMENTS

| 8,420,212 | B2 | 4/2013 | Yoshino |
| 2004/0047047 | A1 | 3/2004 | Yamaguchi et al. |
| 2007/0269653 | A1* | 11/2007 | Kanamori et al. ............ 428/336 |

FOREIGN PATENT DOCUMENTS

| EP | 0556518 | 8/1993 |
| EP | 1854854 | 11/2007 |
| EP | 2070967 | 6/2009 |
| EP | 2133354 | 12/2009 |

(Continued)

OTHER PUBLICATIONS

Extended European Search Report dated Apr. 5, 2012 issued in corresponding European Patent Application No. 12150391.6.

(Continued)

*Primary Examiner* — Kaj K Olsen
*Assistant Examiner* — Alexander Polyansky

(57) ABSTRACT

A coating film to prevent a conspicuous fingerprint has a water contact angle of no less than 60° so that most of water contained in fingerprints on the coating film evaporates without forming a layer adsorbed on the coating film. Further, the coating film has lipophilicity and has a diiodomethane contact angle of no more than 45° so that the coating film exhibits enhanced affinity to fingerprints, which primarily contain oily components.

5 Claims, 1 Drawing Sheet

| Grade | A | B | C | D |
|---|---|---|---|---|
| Fingerprint Visibility | Little to no visibility | Visibility less than that in a case of an untreated substrate | Visibility similar to that in a case of an untreated substrate | High visibility |
| Image | | | | |

(56) References Cited

FOREIGN PATENT DOCUMENTS

| JP | 2001-353808 | 12/2001 |
|----|-------------|---------|
| JP | 2004-359834 | 12/2004 |
| JP | 2010-237279 | 10/2010 |
| WO | 2008/108438 | 9/2008  |

OTHER PUBLICATIONS

Korean Office Action dated Mar. 20, 2017 from Korean Patent Application No. 10-2011-0002338, 13 pages.

* cited by examiner

| Grade | A | B | C | D |
|---|---|---|---|---|
| Fingerprint Visibility | Little to no visibility | Visibility less than that in a case of an untreated substrate | Visibility similar to that in a case of an untreated substrate | High visibility |
| Image | | | | |

COMPOSITION FOR COATING FILM TO PREVENT CONSPICUOUS FINGERPRINTS, COATING FILM TO PREVENT CONSPICUOUS FINGERPRINTS USING THE COMPOSITION, AND ARTICLE HAVING THE COATING FILM

CROSS-REFERENCE TO RELATED APPLICATIONS

This application claims the benefit of Korean Patent Application No. 10-2011-0002338, filed on Jan. 10, 2011, in the Korean Intellectual Property Office, the disclosure of which is incorporated herein in its entirety by reference.

BACKGROUND

1. Field

The present disclosure relates to a composition for a coating film to prevent a conspicuous fingerprint, a coating film to prevent a conspicuous fingerprint using the composition, and an article having the coating film.

2. Description of the Related Art

General digital telecommunication devices, for example, mobile phones, personal computers, navigators, and cash dispensers, are provided with displays and touch panels installed in input/output units. When these digital telecommunication devices are used, since these devices are operated by fingers contacting surfaces of displays, fingerprints are deposited on the surfaces of the displays. Due to oily components contained in the fingerprints, such as sebum, which originates from bodies, and thus such devices become dirty.

To solve this problem, for example, a method of making fingerprints less visible by depositing a separate film having an anti-glare property on a surface of a display of a cellular phone, a navigator, or the like has been used. However, in such a method, increase of haze and decrease of transmittance due to the deposited film may lower image quality. Further, scratches may be generated due to its low surface hardness. Therefore, methods of preventing fingerprints from being deposited on surfaces of displays, touch panels, and the like by directly coating the displays, the touch panels, and the like, instead of depositing a separate film, have been developed.

For example, the following methods have been generally used: (1) a method of forming a coating including fluorine having a water/oil repellent property on a surface of a display, (2) a method of introducing a water repellent silicone resin backbone, such as poly-dimethylsiloxane, on a surface of a display, and (3) a method of reducing a contact area and making deposition of dirt difficult by attaching micro convexes/concaves and enhancing a water/oil repellent property. However, these methods are not suitable for applications such as mobile phones, which come in direct contact with sebum from faces, and touch panels, which are repeatedly touched by fingers. Though a coating having a water/oil repellent property allows fingerprints deposited thereon to be wiped off easily, the coating does not prevent the deposition itself of oily components, which are primary components of fingerprints. Further, the filthiness of fingerprints becomes more conspicuous rather on an oil repellent coating.

Contrary to the aforementioned methods, three have been attempted methods of making a surface of a display water-repellent and lipophilic in order for the surface to have an increase affinity to oily components, such as sebum, of fingerprints thus decreasing visibility of the deposited fingerprints. However, such methods also have a limitation, and thus there is a need for improved methods.

SUMMARY

According to an aspect of the present disclosure, there is provided a composition for a coating film for preventing a fingerprint from becoming conspicuous, including a compound represented by the following Formula 1 and a solvent:

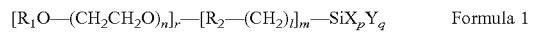  Formula 1 where $R_1$ represents hydrogen or a $C_1$~$C_3$ substituted or unsubstituted alkyl group; n is an integer of 1 to 12; r is 0 or 1; when r is 0, $R_2$ represents a $C_5$~$C_{20}$ substituted or unsubstituted alkyl group, a $C_5$~$C_{20}$ substituted or unsubstituted alkenyl group, a $C_5$~$C_{20}$ substituted or unsubstituted alkynyl group, a $C_5$~$C_{20}$ substituted or unsubstituted aryl group, a $C_6$~$C_{20}$ substituted or unsubstituted arylalkyl group, a $C_5$~$C_{20}$ substituted or unsubstituted cyclic alkylene group, or an alkylene group including a hetero atom; when r is 1, $R_2$ represents a $C_5$~$C_{20}$ substituted or unsubstituted alkylene group, a $C_5$~$C_{20}$ substituted or unsubstituted alkenylene group, a $C_5$~$C_{20}$ substituted or unsubstituted alkynylene group, a $C_5$~$C_{20}$ substituted or unsubstituted arylene group, a $C_6$~$C_{20}$ substituted or unsubstituted arylalkylene group, a $C_5$~$C_{20}$ substituted or unsubstituted cyclic alkylene group, or an alkylene group including a hetero atom; X represents a $C_1$~$C_3$ alkyl group; Y represents a halogen atom, a $C_1$~$C_3$ alkoxy group, or a hydroxyl group; m is an integer of 1 to 3; p is an integer of 0 to 2; q is an integer of 1 to 3; and m+p+q is 4.

A compound represented by Formula 1 may be, for example, at least one selected from the group consisting of methoxyethoxy undecyl trimethoxysilane, methoxytriglycoloxy undecyl trimethoxysilane, 3-methoxyethoxy-4-acetoxycyclohexylethyl-trimethoxysilane, methoxyethoxyundecyltrichlorosilane, 16-(2-methoxy-ethoxy)hexadecyltrichlorosilane, (3-cyclopentadienylpropyl)triethoxysilane, dicyclopentyldimethoxysilane, cyclopentyltrichlorosilane, cyclopentyltrimethoxysilane, cyclohexyltrimethoxysilane, dicyclohexyldichlorosilane, dicyclohexyldimethoxysilane, [2-(3-cyclohexenyl)ethyl]trimethoxysilane, cyclooctyltrimethoxysilane, and derivatives thereof.

According to another aspect of the present disclosure, there is provided a coating film for preventing a fingerprint from becoming conspicuous, including a compound represented by the following Formula 1, the coating film having no less than 60° of water contact angle and no more than 45° of diiodomethane contact angle:

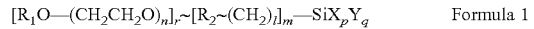  Formula 1 where $R_1$, $R_2$, X, Y, l, m, n, r, p and q, have the same meanings as defined above.

According to still another aspect of the present disclosure, there is provided a method of forming a coating film for preventing a fingerprint from becoming conspicuous, including forming a coating film on a substrate using the aforementioned composition for a coating film for preventing a fingerprint from becoming conspicuous, wherein the forming a coating film on a substrate is performed by a immersion method, an application method, or a vacuum vapor deposition method.

According to further aspect of the present disclosure, there is provided an article including the coating film for preventing a fingerprint from becoming conspicuous on an outer surface of the article.

Additional aspects and/or advantages will be set forth in part in the description which follows and, in part, will be apparent from the description, or may be learned by practice of the invention.

BRIEF DESCRIPTION OF THE DRAWING

These and/or other aspects and advantages will become apparent and more readily appreciated from the following description of the embodiments, taken in conjunction with the accompanying drawing of various grades of a deposited fingerprint based on the visibility of the fingerprint.

DETAILED DESCRIPTION

Hereinafter, aspects of the present disclosure will be described in more detail.

According to one aspect of the present disclosure, a coating film for preventing a conspicuous fingerprint has a water contact angle of no less than 60°, and thus most of water contained in fingerprints on the coating film evaporates without forming a layer adsorbed on the coating film. In addition, since the coating film has lipophilicity and has a diiodomethane contact angle of no more than 45°, the coating film exhibits enhanced affinity to fingerprints, which primarily contain oily components. As a result, fingerprints deposited on the coating film soak and spread into an interface of the coating film, and an oily thin layer is formed in the area where the fingerprints were deposited. Therefore, fingerprints on a substrate coated with the coating film become invisible, and filthiness of fingerprints may be prevented from being conspicuous.

According to other aspect of the present disclosure, there is provided a composition for a coating film for preventing a conspicuous fingerprint, including a compound represented by the following Formula 1 and a solvent:

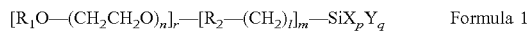   Formula 1 where $R_1$ represents hydrogen or a $C_1$~$C_3$ substituted or unsubstituted alkyl group; n is an integer of 1 to 12; r is 0 or 1; when r is 0, $R_2$ represents a $C_5$~$C_{20}$ substituted or unsubstituted alkyl group, a $C_5$~$C_{20}$ substituted or unsubstituted alkenyl group, a $C_5$~$C_{20}$ substituted or unsubstituted alkynyl group, a $C_5$~$C_{20}$ substituted or unsubstituted aryl group, a $C_6$~$C_{20}$ substituted or unsubstituted arylalkyl group, a $C_5$~$C_{20}$ substituted or unsubstituted cyclic alkylene group, or an alkylene group including a hetero atom; when r is 1, $R_2$ represents a $C_5$~$C_{20}$ substituted or unsubstituted alkylene group, a $C_5$~$C_{20}$ substituted or unsubstituted alkenylene group, a $C_5$~$C_{20}$ substituted or unsubstituted alkynylene group, a $C_5$~$C_{20}$ substituted or unsubstituted arylene group, a $C_5$~$C_{20}$ substituted or unsubstituted arylalkylene group, a $C_5$~$C_{20}$ substituted or unsubstituted cyclic alkylene group, or an alkylene group including a hetero atom; X represents a $C_1$~$C_3$ alkyl group; Y represents a halogen atom, a $C_1$~$C_3$ alkoxy group, or a hydroxyl group; m is an integer of 1 to 3; p is an integer of 0 to 2; q is an integer of 1 to 3; and m+p+q is 4.

When the coating film for preventing a conspicuous fingerprint is formed on a surface of a substrate, the compound represented by Formula 1 is linked to the substrate by siloxane-bonds via a chemical reaction, and all parts of the compound represented by Formula 1 excluding parts of Si atoms are oriented outwardly from the surface of the substrate, and thus the coating film has good durability. As a result, the coating film is not peeled easily when wiping deposited fingerprints off the coating film. Such a chemical adsorbing material may be used alone or in any combination of two or more materials. Further, the degree to which water and oil are soaked into the coating film may be adjusted by properly selecting a hydrocarbon group that is oriented outwardly from the surface of the substrate.

A silane compound in which a hydrophilic moiety and a water repellent moiety are coupled, and having the structure represented by Formula 1, may be a compound represented by the following Formula 2 or 3:

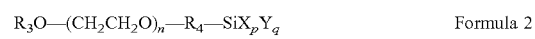   Formula 2 where $R_3$ represents hydrogen or a $C_1$~$C_3$ substituted or unsubstituted alkyl group; n is an integer of 1 to 12; $R_4$ represents a $C_5$~$C_{20}$ substituted or unsubstituted alkylene group, a $C_5$~$C_{20}$ substituted or unsubstituted alkenylene group, a $C_5$~$C_{20}$ substituted or unsubstituted alkynylene group, a $C_5$~$C_{20}$ substituted or unsubstituted arylene group, a $C_6$~$C_{20}$ substituted or unsubstituted arylalkylene group, a $C_5$~$C_{20}$ substituted or unsubstituted cyclic alkylene group, or an alkylene group including a hetero atom; X represents a $C_1$~$C_3$ alkyl group; Y represents a halogen atom or a $C_1$~$C_3$ alkoxy or hydroxyl group; p is 0, 1, or 2; and p+q is 3.

   Formula 3 where R5 represents a C5~C20 substituted or unsubstituted cyclic alkyl group or a C5~C20 substituted or unsubstituted cyclic alkenyl group; m is an integer of 1 to 3; l is an integer of 0 to 6; and Y represents a halogen atom or a $C_1$~$C_3$ alkoxy or hydroxyl group.

Furthermore, a compound represented by Formula 1 may be a compound where $R_1$ represents methyl; n is an integer of 1 to 3; r is 1; $R_2$ represents a $C_8$~$C_{18}$ alkylene group; Y represents methoxy, ethoxy or Cl; p is 0; and q is 3. In addition, a compound represented by Formula 1 may be a compound where r is 0; $R_2$ represents a $C_5$~$C_8$ cyclic alkyl group or a $C_5$~$C_8$ cyclic alkenyl group; m is an integer of 1 or 2; l is an integer of 0 to 3; and Y represents methoxy, ethoxy or Cl.

Specific examples of compounds having the structure represented by Formula 1 are methoxyethoxyundecyltrimethoxysilane, methoxytriglycoloxy-undecyltrimethoxysilane, 3-methoxyethoxy-4-acetoxycyclohexylethyltrimethoxysilane, methoxyethoxyundecyltrichlorosilane, 16-(2-methoxy-ethoxy)hexadecyltrichlorosilane, and derivatives thereof, which are examples of compounds having the structure represented by Formula 2; and (3-cyclopentadienylpropyl)triethoxysilane, dicyclopentyldimethoxysilane, cyclopentyltrichlorosilane, cyclopentyltrimethoxysilane, cyclohexyltrimethoxysilane, dicyclohexyldichlorosilane, dicyclohexyldimethoxysilane, [2-(3-cyclohexenyl)ethyl]trimethoxysilane, cyclooctyltrimethoxysilane, and derivatives thereof, which are examples of compounds having the structure represented by Formula 3. Further, these compounds may be used alone or in any combination thereof.

A content of a compound represented by Formula 1 in the composition for a coating film for preventing a conspicuous fingerprint is about 0.01 to about 40 parts by weight based on 100 parts by weight of a solvent. Further, the content of a compound represented by Formula 1 in the composition for a coating film for preventing a conspicuous fingerprint may vary according to a method of forming a coating film for preventing a conspicuous fingerprint using the aforementioned composition. For example, if the method of forming a coating film for preventing a conspicuous fingerprint is a method of immersing a substrate into the composition or a method of applying the composition on a substrate, the content of a compound represented by Formula 1 in the composition for a coating film for preventing a conspicuous fingerprint may be about 0.01 to about 1 parts by weight based on 100 parts by weight of a solvent. On the other hands, if the method is a dry-method, such as a vacuum vapor deposition method, the content of a compound represented by Formula 1 in the composition for a coating film for preventing a conspicuous fingerprint may be about 5 to about 40 parts by weight based on 100 parts by weight of a solvent.

Specific examples of a solvent in the composition for a coating film for preventing conspicuous fingerprint are alcohols, such as methanol, ethanol, and isopropanol; aliphatic hydrocarbons, such as hexadecane, octane, and hexane; cyclic hydrocarbons, such as cyclohexane and cyclopentane; aromatic hydrocarbons, such as toluene, xylene, and benzene; and organic halogen compounds, such as carbontetrachloride, chloroform, and methylene chloride. These solvents may be used alone or in any combination of two or more solvents.

The composition for a coating film for preventing a conspicuous fingerprint may further include additives such as a lubricant to impart a lubricating property to a coating film formed later.

The lubricant is not limited to any component as long as it can impart a lubricating property to a coating film without adversely affecting basic qualities of the coating film. Non-limited examples of the lubricant are unsaturated fatty acids, such as myristoleic acid, palmitoleic acid, and oleic acid; saturated fatty acids, such as lauric acid, palmitic acid, and stearic acid; and hydrocarbon materials, such as hydrocarbon oils, such as squalene, triolein, and jojoba oil. These lubricants may be used alone or in any combination of two or more lubricants.

A content of the lubricant is about 0.05 to about 50 parts by weight based on 100 parts by weight of a solvent. If the content of the lubricant is within the range set forth above, a touch feeling perceived by a user when the user's fingers contact a coating film formed of the composition for a coating film for preventing a conspicuous fingerprint may be improved without affecting the ability of the coating film to prevent a conspicuous fingerprint.

According to another aspect of the present disclosure, there is provided a coating film for preventing a conspicuous fingerprint, including a compound represented by the following Formula 1, wherein the coating film has a water contact angle of no less than 60° and a diiodomethane contact angle of no more than 45°:

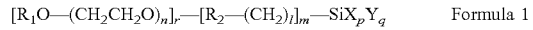
$$[R_1O—(CH_2CH_2O)_n]_r—[R_2—(CH_2)_l]_m—SiX_pY_q \quad \text{Formula 1}$$

where $R_1$, $R_2$, $X$, $Y$, $l$, $m$, $n$, $r$, $p$, and $q$ have the same meanings as defined above.

Further, as described above, a silane compound in which a hydrophilic moiety and a water repellent moiety are coupled, and having the structure represented by Formula 1, may be a compound represented by the Formula 2 or 3:

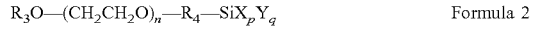
$$R_3O—(CH_2CH_2O)_n—R_4—SiX_pY_q \quad \text{Formula 2}$$

where $R_3$, $R_4$, $X$, $Y$, $n$, $p$, and $q$ are have the same meanings as defined above.

$$[R_5—(CH_2)_l]_m—SiY_{4-m} \quad \text{Formula 3}$$

where $R_5$, $Y$, $l$, and $m$ are have the same meanings as defined above.

The water contact angle and the diiodomethane contact angle of the coating film formed on a substrate are measured to evaluate hydrophilicity and lipophilicity of the coating film. These values are obtained by dropping a drop of each of pure water and diiodomethane on the coating film, and then measuring contact angles of the water and the diiodomethane with respect to the coating film after a predetermined time.

Generally, fingerprints comprise water excreted naturally from a human body and oils or oily components excreted from skin or transferred by hands via contact with other various articles. Therefore, to prevent a conspicuous fingerprint, the coating film may have an optimized combination of affinities to the two components contained in fingerprints, rather than having only one of hydrophilicity and lipophilicity. That is, both the water contact angle and the diiodomethane contact angle may be adjusted properly to optimize a surface property of the coating film.

Specifically, the water contact angle of the coating film for preventing a conspicuous fingerprint is, for example, no less than 60°, or, 65° to 100°. When the water contact angle is within these ranges, most of water components of a fingerprint on the coating film evaporate without forming a layer adsorbed on the coating film. The water contact angle may be optimized at the value of 60° or more by adjusting the value of n, the recurring number of an ethyleneoxy group moiety, i.e., a —(CH$_2$CH$_2$O)$_n$— moiety, which is a hydrophilic segment of the structure represented by Formula 1.

The diiodomethane contact angle of the coating film for preventing a conspicuous fingerprint is, for example, no more than 45°, or, 30° to 43°. When the diiodomethane contact angle is within these ranges, the coating film exhibits lipophilicity, and thus, affinity of the coating film to fingerprints containing primarily oily components is enhanced. As a result, fingerprints deposited on the coating film soak and spread into an interface of the coating film, and an oily thin layer is formed in the area where the fingerprints were deposited. Therefore, fingerprints on a substrate coated with the coating film become invisible, and filthiness derived from fingerprints may be prevented from being conspicuous. The diiodomethane contact angle may be optimized at 45° or less by adjusting the value of l, the recurring number of a methylene group moiety, i.e. a —(CH$_2$)$_l$— moiety, which is a hydrophobic segment in the structure represented by Formula 1.

Specific examples of compounds having the structure represented by Formula 1 are methoxyethoxyundecyltrimethoxysilane, methoxytriglycoloxy-undecyltrimethoxysilane, 3-methoxyethoxy-4-acetoxycyclohexylethyltrimethoxysilane, methoxyethoxyundecyltrichlorosilane, 16-(2-methoxy-ethoxy)hexadecyltrichlorosilane, and derivatives thereof, which are examples of compounds having the structure represented by Formula 2; and (3-cyclopentadienylpropyl)triethoxysilane, dicyclopentyldimethoxysilane, cyclopentyltrichlorosilane, cyclopentyltrimethoxysilane, cyclohexyltrimethoxysilane, dicyclohexyldichlorosilane, dicyclohexyldimethoxysilane, [2-(3-cyclohexenyl)ethyl]trimethoxysilane, cyclooctyltrimethoxysilane, and derivatives thereof, which are examples of compounds having the structure represented by Formula 3. Further, these compounds may be used alone or in any combination thereof.

The coating film for preventing a conspicuous fingerprint may further include a lubricant to impart a lubricating property to the coating film without adversely affecting basic qualities of the coating film, and non-limited examples of the lubricant are unsaturated fatty acids, saturated fatty acids, and hydrocarbon oils.

According to another aspect of the present disclosure, there is provided a method of forming a coating film for preventing a conspicuous fingerprint, including forming a coating film on a substrate using the composition for a coating film for preventing a conspicuous fingerprint described above, wherein the forming of a coating film on a substrate is performed by an immersion method, an application method, or a vacuum vapor deposition method.

Specifically, a method of forming a coating film on a substrate using a compound represented by Formula 1 present in the composition for a coating film for preventing a conspicuous fingerprint is not particularly limited to any one method, and for example, the method may be a method of immersing a substrate in the composition, a method of applying the composition on a substrate, or a vacuum vapor deposition method. A surface of a substrate may have functional groups including active hydrogen, e.g., a hydroxyl group, a carboxyl group, a thiol group, a sulfonic acid group, and the like. If a surface of a substrate has no or little functional groups including active hydrogen, the surface of the substrate may be treated to provide active hydrogen thereon. Such a treatment may be done by methods known in the art, for example, a corona discharge treatment, a UV/ozone treatment, an oxygen plasma treatment, a treatment involving a chemical oxidizing agent, such as potassium permanganate, and the like.

The coating film for preventing a conspicuous fingerprint according to the present disclosure may be applied to substrates that are prone to being contaminated by fingerprints. Specific examples of the substrate are glass, metal, ceramic, plastic, wood, stone, and the like.

According to another aspect of the present disclosure, there is provided an article including the coating film for preventing a conspicuous fingerprint on an outermost surface of the article.

Thus, the coating film for preventing a conspicuous fingerprint may be formed on surfaces of displays, touch panels, or information terminals including substrates. Further, such a display may be a CRT, an LCD, a PDP, an LED, or a FED. A display or a touch panel on which the coating film is applied, or an information terminal employing the display or the touch panel may be employed in personal computers, notebooks, cellular phones, navigators, cash dispensers, security systems, and the like, in which filthiness derived from fingerprints will be no longer conspicuous.

The coating film for preventing a conspicuous fingerprint according to the present disclosure may have optical properties, such as transmittance and refraction, that do not affect color tone or glossy of images displayed on a substrate, such as a display. Further, the coating film may not affect operation quality of touch panels.

Hereinafter, embodiments according to the present disclosure will be described in more detail in Examples and Comparative Examples.

Example 1

First, a composition for a coating film for preventing a conspicuous fingerprint was prepared by dissolving methoxyethoxyundecyltrichlorosilane in xylene. The content of methoxyethoxyundecyltrichlorosilane in the composition was 0.1% by weight. Then, a slide glass (5×8 cm) was washed with isopropanol, the washed glass was immersed in the prepared composition for 1 hour, and the solvent was evaporated therefrom using a hot wind drier that blew air at a temperature of 100° C. for 30 min. Thereby, dehydrochlorination was generated by a plurality of hydroxyl groups at a surface of the glass and chlorosilyl groups in the composition, and, methoxyethoxyundecyl groups were adsorbed chemically to the surface of the glass by siloxane linkers, and, unreacted Cl groups were replaced by OH groups. Then, dehydration was generated between adjacent OH groups by drying with a hot wind drier that blew air at a temperature of 100° C. for 1 hour, resulting in formation of cross-linking structures across the surface of the glass. Then, the surface of the glass was washed with xylene to remove unreacted materials. Thereby, a coating film for preventing a conspicuous fingerprint including functional groups in which a hydrophilic moiety and a lipophilic moiety are coupled was formed on the surface of the glass.

Example 2

A coating film including functional groups in which a hydrophilic moiety and a lipophilic moiety are coupled was formed on a surface of a glass using the same method as in Example 1 except methoxytriglycoloxyundecyltrimethoxysilane was used instead of methoxy-ethoxyundecyltrichlorosilane.

Example 3

A coating film including cyclic alkyl groups was formed on a surface of a glass using the same method as in Example 1 except cyclopentyltrichlorosilane was used instead of methoxyethoxyundecyltrichlorosilane.

Example 4

A coating film including cyclic alkyl groups was formed on a surface of a glass using the same method as in Example 1 except cyclohexyltrimethoxysilane was used instead of methoxyethoxyundecyltrichlorosilane.

Example 5

A coating film including cyclic alkyl groups was formed on a surface of a glass using the same method as in Example 1 except dicyclopentyldimethoxysilane was used instead of methoxyethoxyundecyltrichlorosilane.

Example 6

A coating film including cyclic alkyl groups was formed on a surface of a glass using the same method as in Example 1 except dicyclohexyldimethoxysilane was used instead of methoxyethoxyundecyltrichlorosilane.

Example 7

A coating film including cyclic alkyl groups was formed on a surface of a glass using the same method as in Example 1 except (3-cyclopentadienylpropyl)triethoxy-silane was used instead of methoxyethoxyundecyltrichlorosilane.

Example 8

A coating film including cyclic alkyl groups was formed on a surface of a glass using the same method as in Example 1 except [2-(3-cyclohexenyl)ethyl]trimethoxy-silane was used instead of methoxyethoxyundecyltrichlorosilane.

Example 9

A coating film including cyclic alkyl groups was formed on a surface of a glass using the same method as in Example 1 except cyclooctyltrimethoxysilane was used instead of methoxyethoxyundecyltrichlorosilane.

Comparative Example 1

A coating film was formed on a surface of a glass using the same method as in Example 1 except methoxytriethyleneoxypropylmethoxysilane was used instead of methoxyethoxyundecyltrichlorosilane.

Comparative Example 2

A coating film was formed on a surface of a glass using the same method as in Example 1 except methoxypolyethyleneoxypropyltrimethoxysilane (including 6-9 ethyleneoxy repetitive units) was used instead of methoxyethoxyundecyltrichlorosilane.

Comparative Example 3

A coating film was formed on a surface of a glass using the same method as in Example 1 except 3-methoxypropyltrimethoxysilane was used instead of methoxyethoxyundecyltrichlorosilane.

Comparative Example 4

A coating film was formed on a surface of a glass using the same method as in Example 1 except hexadecyltrimethoxysilane was used instead of methoxyethoxyundecyl-trichlorosilane.

Evaluation Experiment (1) Water Contact Angle 0.002 ml of pure water was dropped on a coating film, and a contact angle was measured after 1 min using an instrument made by First Ten Ångstroms corporation. (unit: Degree)

(2) Diiodomethane Contact Angle

A contact angle was measured by the same method as in the measurement of water contact angle except that diiodomethane was used instead of pure water. (unit: Degree)

(3) Anti-Fingerprint Stain Property

A thumb was pressed vertically onto a coating film for 3 seconds to deposit a fingerprint on the coating film. Then, the deposited fingerprint was evaluated with the unaided eye, based on grades shown in the drawing.

(4) Ease of Wiping Fingerprint

A thumb was pressed vertically onto a coating film for 3 seconds to deposit a fingerprint on the coating film. Then, the deposited fingerprint was rubbed lightly with Kim Wipes Tissue available commercially from Yuhan Kimberly. Ease of wiping fingerprint was evaluated based on the number of rubbings performed until the deposited fingerprint was not visible.

Results of evaluation are shown in Table 1.

TABLE 1

| | Water Contact Angle (Degree) | Diiodomethane Contact Angle (Degree) | Anti-fingerprint stain property | Ease of wiping fingerprint |
|---|---|---|---|---|
| Example 1 | 76 | 36 | A | 2 |
| Example 2 | 67 | 37 | B | 4 |
| Example 3 | 82 | 40 | A | 2 |
| Example 4 | 78 | 41 | A | 3 |
| Example 5 | 72 | 43 | A | 4 |
| Example 6 | 74 | 43 | A | 4 |
| Example 7 | 75 | 42 | A | 3 |
| Example 8 | 71 | 43 | A | 4 |
| Example 9 | 79 | 42 | A | 3 |
| Comparative Example 1 | 50 | 46 | D | 6 |
| Comparative Example 2 | 45 | 45 | D | 8 |
| Comparative Example 3 | 52 | 43 | D | 7 |
| Comparative Example 4 | 85 | 53 | C | 7 |

As shown in Table 1, in the cases of the coating films for preventing a conspicuous fingerprint prepared in Examples 1 to 9, which include compounds represented by Formula 1 or 2, since oily components contained in fingerprints soaked into the coating films on the surfaces of the glasses and spread thinly across the coating films, the fingerprints disappeared from sight. That is, the fingerprints were not discernible by the eye. In these cases, the water contact angles of the coating films were no less than 60°, and the diiodomethane contact angles were no more than 45°.

On the other hand, in cases of the coating films prepared in Comparative Examples 1 to 4, oily components contained in fingerprints did not soak into the coating films over time, but stains remained visible.

As a result, it was demonstrated that each of the coating films prepared in Examples 1 to 9 were capable of preventing a conspicuous fingerprint. Furthermore, when using a touch panel, or when using a CRT, an LCD, a PDP, an FED or an LED as a display in which a touch panel is employed, if outermost surfaces thereof were formed of glass, the same results would be obtained. Moreover, if a display or a touch panel with any of the aforementioned coating films formed on surface thereof is applied to personal PCs, notebook PCs, mobile phones, navigators, and cash dispensers, dirtiness due to fingerprint stains may be reduced greatly in an input/output unit.

While the present disclosure has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A coating film for preventing a conspicuous fingerprint, comprising a compound represented by the following Formula 1, the coating film having a water contact angle of no less than 60° and a diiodomethane contact angle of no more than 45°:

$$[R_1O—(CH_2CH_2O)_n]_r—[R_2—(CH_2)_l]_m—SiX_pY_q \quad \text{Formula 1}$$

where $R_1$ represents hydrogen or a $C_1$-$C_3$ substituted or unsubstituted alkyl group;
n is an integer of 1 to 12;
r is 0 or 1;
when r is 0, $R_2$ represents a $C_5$~$C_{20}$ substituted or unsubstituted alkyl group, a $C_5$~$C_{20}$ substituted or unsubstituted alkenyl group, a $C_5$~$C_{20}$ substituted or unsubstituted alkynyl group, a $C_5$~$C_{20}$ substituted or unsubstituted aryl group, a $C_6$~$C_{20}$ substituted or unsubstituted arylalkyl group, a $C_5$~$C_{20}$ substituted or unsubstituted cyclic alkylene group, or an alkylene group including a hetero atom;
when r is 1, $R_2$ represents a $C_5$~$C_{20}$ substituted or unsubstituted alkylene group, a $C_5$~$C_{20}$ substituted or unsubstituted alkenylene group, a $C_5$~$C_{20}$ substituted or unsubstituted alkynylene group, a $C_5$~$C_{20}$ substituted or unsubstituted arylene group, a $C_6$~$C_{20}$ substituted or unsubstituted arylalkylene group, a $C_5$~$C_{20}$ substituted or unsubstituted cyclic alkylene group, or an alkylene group including a hetero atom;
X represents a $C_1$~$C_3$ alkyl group;
Y represents a halogen atom, a $C_1$~$C_3$ alkoxy group, or a hydroxyl group;
m is an integer of 1 to 3; p is an integer of 0 to 2; q is an integer of 1 to 3; and m+p+q is 4, wherein the compound represented by Formula 1 is at least one selected from the group consisting of methoxyethoxyundecyl-trimethoxysilane, methoxytriglycoloxyundecyltrimethoxysilane, 3-methoxyethoxy-4-acetoxy-cyclohexylethyl-trimethoxysilane, methoxyethoxyundecyltrichlorosilane, 16-(2-methoxyethoxy)hexadecyltrichlorosilane, (3-cyclopentadienylpropyl)triethoxysilane, dicyclopentyl-dimethoxysilane, cyclopentyltrichlorosilane, dicyclohexyldichlorosilane, [2-(3-cyclohexenyl)ethyl]trimethoxysilane, and derivatives thereof.

2. The coating film of claim 1, wherein the compound represented by Formula 1 is a compound represented by the following Formula 2 or 3:

$$R_3O—(CH_2CH_2O)_n—R_4—SiX_pY_q \quad \text{Formula 2}$$

where $R_3$ represents hydrogen or a $C_1$~$C_3$ substituted or unsubstituted alkyl group;

n is an integer of 1 to 12;

$R_4$ represents a $C_5$~$C_{20}$ substituted or unsubstituted alkylene group, a $C_5$~$C_{20}$ substituted or unsubstituted alkenylene group, a $C_5$~$C_{20}$ substituted or unsubstituted alkynylene group, a $C_5$~$C_{20}$ substituted or unsubstituted arylene group, a $C_6$~$C_{20}$ substituted or unsubstituted arylalkylene group, a $C_5$~$C_{20}$ substituted or unsubstituted cyclic alkylene group, or an alkylene group including a hetero atom;

X represents a $C_1$~$C_3$ alkyl group; Y represents a halogen atom or a $C_1$~$C_3$ alkoxy or hydroxyl group;

p is 0, 1, or 2; and p+q is 3;

$$[R_5-(CH_2)_l]_m-SiY_{4-m} \qquad \text{Formula 3}$$

where $R_5$ represents a $C_5$~$C_{20}$ substituted or unsubstituted cyclic alkyl group or a $C_5$~$C_{20}$ substituted or unsubstituted cyclic alkenyl group;

m is an integer of 1 to 3; l is an integer of 0 to 6; and

Y represents a halogen atom or a $C_1$~$C_3$ alkoxy or hydroxyl group.

3. The coating film of claim 1, further comprising at least one lubricant selected from the group consisting of unsaturated fatty acids, saturated fatty acids, and hydrocarbon oils.

4. An article comprising the coating film for preventing a conspicuous fingerprint according to claim 1 on outermost surfaces thereof.

5. The article of claim 4, wherein the article is a display, a touch panel, or an information terminal.

* * * * *

UNITED STATES PATENT AND TRADEMARK OFFICE
CERTIFICATE OF CORRECTION

| | |
|---|---|
| PATENT NO. | : 9,637,644 B2 |
| APPLICATION NO. | : 13/343953 |
| DATED | : May 2, 2017 |
| INVENTOR(S) | : Cheol Ham et al. |

Page 1 of 1

It is certified that error appears in the above-identified patent and that said Letters Patent is hereby corrected as shown below:

In the Claims

Column 10, Line 28 – In Claim 1, delete "$C_1$-$C_3$" and insert -- $C_1$~$C_3$ --, therefore Signed and Sealed this
Eighth Day of August, 2017

Joseph Matal
*Performing the Functions and Duties of the
Under Secretary of Commerce for Intellectual Property and
Director of the United States Patent and Trademark Office*